United States Patent [19]

Hsu

[11] Patent Number: 4,936,702
[45] Date of Patent: Jun. 26, 1990

[54] GARDEN TOOL QUICK HANDLE CONNECTOR

[76] Inventor: Chun-Li Hsu, No. 426, Dou Yuan East Rd., Ho Fong Tsun, Pei Tou Hsiang, Chang Hwa Hsein, Taiwan

[21] Appl. No.: 360,671

[22] Filed: Jun. 2, 1989

[51] Int. Cl.$^5$ ............................................. B25G 3/00
[52] U.S. Cl. .................................. 403/316; 403/348; 403/343; 403/375; 285/82
[58] Field of Search ............... 403/348, 375, 349, 343, 403/316, 315, 319, 320; 285/82, 91, 7, 88; 81/177.85

[56] References Cited

U.S. PATENT DOCUMENTS

| | | | |
|---|---|---|---|
| 3,049,367 | 8/1962 | Lashta | 285/7 |
| 3,948,545 | 4/1976 | Bonds | 285/91 X |
| 4,232,422 | 11/1980 | Fellmann | 403/343 X |
| 4,669,755 | 6/1987 | Harris et al. | 285/7 |
| 4,768,258 | 9/1988 | Langestein | 403/348 X |

FOREIGN PATENT DOCUMENTS

| | | | |
|---|---|---|---|
| 75208885 | 7/1989 | Taiwan . | |
| 2152168 | 7/1985 | United Kingdom | 285/82 |

Primary Examiner—Randolph A. Reese
Assistant Examiner—Franco S. DeLiguori
Attorney, Agent, or Firm—Varndell Legal Group

[57] ABSTRACT

This invention relates generally to a garden tool quick handle connector and relates more particularly to a connection structure for quick connection of a handle to a garden tool wherein inner convex threads of the handle are conveniently arranged to engage with outer convex threads of the handle connector. A special retaining plate is movably provided to serve as a stop to maintain the handle in its engaged position with the garden tool and to protect the connection against torsional force.

2 Claims, 3 Drawing Sheets

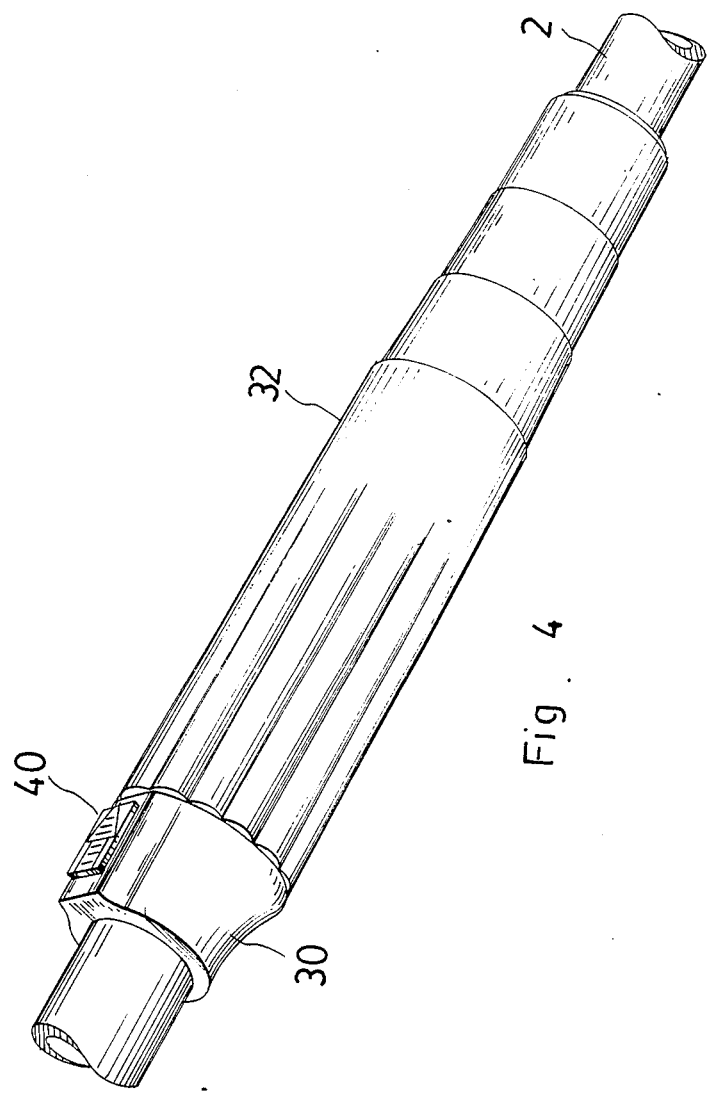

GARDEN TOOL QUICK HANDLE CONNECTOR

BACKGROUND AND SUMMARY OF THE INVENTION

Regular garden tools are innumerable, among which harrows, hoes and shovels are most commonly used. During tillage action like anchoring, burying, inversion, mixing, loosening operation etc., one may stand up or squat to perform the operation. In order to facilitate the operation, some garden tools may be equipped with a long handle or a short handle for choice. In recent years, garden tools are commonly made to have a handle connector for alternatively connecting a short handle and long handle thereto. In a typical method, the connection of a garden tool with a handle is made through screw joint. However, the thread tapping requires high precision work of which the cost is relatively high. Further, the screw joint takes a long amount of time to complete and the threads tend to break after a certain period of application. In order to solve these problems, a new connector has been provided to improve the connection, which connector is as shown in FIGS. 1 and 2. In this connector, the rectangular oblique male fastening elements are arranged to set in the rectangular oblique female fastening elements through a pivot connection, which permits the garden tool handle connector to be firmly retained with the handle portion. This connection is indeed very convenient to operate. However, the pivot connection of the male fastening elements with the female fastening elements can not protect against torsional force. During operation, the male and female fastening elements tend to break away from each other.

The main object of the present invention is to provide a garden tool quick handle connector wherein inner convex threads of the handle are conveniently arranged to engage with outer convex threads of the handle connector to protect the connection against forward-backward force.

Another object of the present invention is to provide a garden tool quick handle connector wherein a retaining element is provided to serve as a stop means to reinforce the engagement of the inner and outer threads of the handle connector and the handle and to protect the connection against torsional force.

The above and other objects and features of the present invention will become fully understood from the following detailed description of the preferred embodiments, considered in connection with the annexed drawings as hereunder.

BRIEF DESCRIPTION OF THE DRAWINGS

FIG. 3-1 is a side sectional view of the movably retaining plate.

FIG. 4 is a perspective view of the present invention in assembled position.

DETAILED DESCRIPTION OF THE PREFERRED EMBODIMENTS

Figure 1:
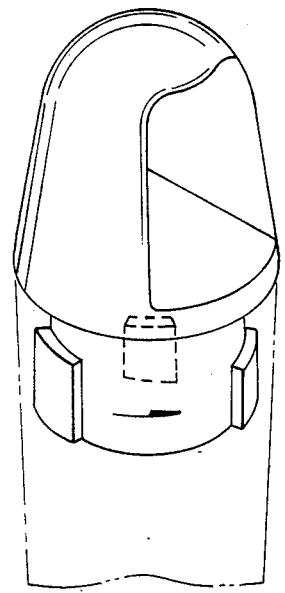
FIG. 1 is a perspective fragmentary view of a prior art connector.
Figure 2:
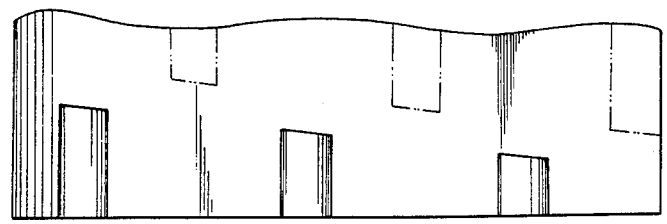
FIG. 2 is a schematic plan view of the prior art connector of FIG. 1.
Figure 3:
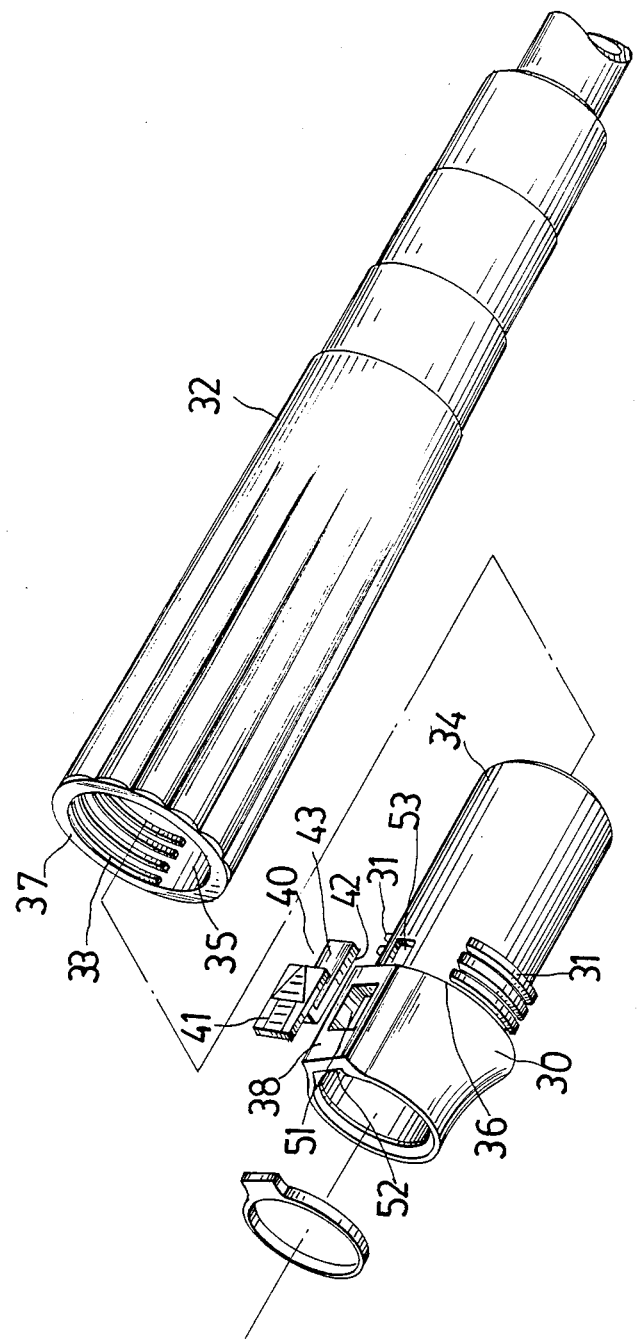
FIG. 3 is a perspective fragmentary view of a connector of the present invention.
Figures 1, 3:
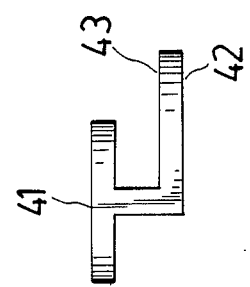

Referring now to FIGS. 3 and 4, there is shown an embodiment of the garden tool quick handle connector in accordance with the present invention. The handle connector 30 has a stepped tubular configuration including a cylindrical front end having two sets of parallel convex threads 31 extending from the outer wall surface thereof near the step edge 36. The sets of parallel convex threads 31 extend respectively from opposite sides of the handle connector 30 with passageways 34 therebetween. The handle 32 has two sets of parallel convex threads 33 extending from the inner wall surface thereof near the bottom end 37. The sets of parallel convex threads 33 extend respectively from opposite sides of the handle 32 with passageways 35 therebetween. When the handle 32 is mounted on the handle connector 30, the two sets of convex threads 33 of the handle 32 pass through the passageways 34 between the two sets of convex threads 31 of the handle connector 30 and the two sets of convex threads 31 of the handle connector 30 simultaneously pass through the passageways 35 between the two sets of convex threads 33 of the handle 32. This permits the step edge 36 of the handle connector 30 be held tightly in contact with the bottom end 37 of the handle 32. At this position, the outer convex threads 31 and the inner convex threads 33 can respectively engage with or slip between one another. As soon as the handle connector 30 is rotated through an angle of 90°, the inner and outer convex threads 33 and 31 are respectively engaged with one another enabling the handle connector 30 and the handle 32 to become firmly connected with each other.

The handle connector 30 further includes a flat upper surface 38 having an upper rectangular hole 51, an inner sliding way 52 on its inner wall surface, and a lower rectangular hole 53 in front of the step edge 36, which communicates with the upper rectangular hole 51 via the sliding way 52. A zigzag retaining plate 40 which is comprised of an upper retaining element 41 and a lower retaining element 42 is set in the upper and lower rectangular holes 51 and 53 with the upper retaining element 41 stopped at the upper rectangular hole 51 and disposed outside of the handle connector 30 and with the lower retaining element 42 passing from the upper rectangular hole 51 through the sliding way 52 so that the upper surface 43 of the lower retaining element 42 is exposed by the lower rectangular hole 53. When the upper retaining element 41 is pushed backward, the lower retaining element 42 will retreat and not protrude from the step edge 36 and thus become entirely concealed beneath the flat upper surface 38.

FIG. 4 illustrates the connected position of the handle connector 30 with the handle 32. During assembly, the handle connector 30 is inserted into the handle 32 so that the convex threads 31 and 32 respectively pass through the passageways 34 and 35. As soon as the step edge 36 and the bottom end 37 contact, the handle connector 30 is rotated through an angle of 90° relative to the handle 32 which permits the convex threads 31 and 33 to engage each other. The upper retaining element 41 which is originally set at the rear position on the flat upper surface 38 of the handle connector 30 is pushed forward, so that the lower retaining element 42 protrudes from the bottom of the lower rectangular hole 53. This arrangement of element 42 acts as a stop means by preventing the handle connector 30 and the handle 32 from rotating relative to each other to the extent that convex threads 31 and 33 can respectively enter passageways 34 and 35, so that the convex threads 31 and 33 are maintained in an engaged position.

In conclusion, as described above, the present invention provides a garden tool quick connector which permits a handle to be quickly connected to the handle connector through a threaded engagement, and which provides a retaining plate to maintain the handle and connector in the engaged position.

I claim:
1. A garden tool quick handle connector, comprising:
   a handle connector having first and second tubular portions with a step therebetween, said first tubular portion being of a smaller diameter than said second tubular portion, said first tubular portion having a lower rectangular hole adjacent said step and two sets of outer parallel threads on its outer surface near said step, said parallel threads being arranged on opposite sides of said outer surface with first passageways therebetween; said second tubular portion having a flat region defining top and bottom surfaces, said bottom surface defining a sliding way, and said top surface having an upper rectangular hole communicating with said sliding way;
   a hollow handle having two sets of inner parallel threads on its inner surface, said inner parallel threads being located on opposite sides of said inner surface near an end of said handle with second passageways therebetween, and
   a retaining plate having an upper retaining element connected to a lower retaining element, said retaining plate passing through said upper rectangular hole and being arranged with said handle connector so that said upper retaining element slides on said top surface and said lower retaining element slides within said sliding way,
   wherein said hollow handle firstly receives said handle connector therein by said outer parallel threads passing through said second passageways and said inner parallel threads passing through said first passageways, said hollow handle secondly engages said handle connector by said handle connector being rotated 90 degrees relative to said hollow handle and said inner and outer parallel threads engaging, and said hollow handle thirdly locks with said handle connector by said upper retaining element being pushed toward said handle so that said lower retaining element slides along said sliding way into said lower rectangular hole, said lower retaining element protruding upwardly from said lower rectangular hole and acting as a stop to prevent said inner and outer parallel threads from respectively entering said first and second passageways and disengaging from each other.

2. A garden tool quick handle connector according to claim 1, wherein said inner and outer parallel threads are arranged to slip between one another when engaged.

* * * * *